(12) United States Patent
Hyung et al.

(10) Patent No.: US 8,401,783 B2
(45) Date of Patent: Mar. 19, 2013

(54) METHOD OF BUILDING MAP OF MOBILE PLATFORM IN DYNAMIC ENVIRONMENT

(75) Inventors: Seung Yong Hyung, Yongin-si (KR); Kyung Shik Roh, Seongnam-si (KR); Suk June Yoon, Seoul (KR); Sung Hwan Ahn, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 654 days.

(21) Appl. No.: 12/654,037

(22) Filed: Dec. 8, 2009

(65) Prior Publication Data
US 2010/0161225 A1 Jun. 24, 2010

(30) Foreign Application Priority Data

Dec. 22, 2008 (KR) .................. 10-2008-0131035

(51) Int. Cl.
*G06F 17/00* (2006.01)
(52) U.S. Cl. ....................................................... 701/301

(58) Field of Classification Search .................... 701/23, 701/28, 301; 700/245
See application file for complete search history.

(56) References Cited

U.S. PATENT DOCUMENTS 6,476,803 B1 * 11/2002 Zhang et al. .................. 345/419
2009/0262974 A1 * 10/2009 Lithopoulos .................. 382/100

* cited by examiner

*Primary Examiner* — Kim T Nguyen
(74) *Attorney, Agent, or Firm* — Staas & Halsey LLP (57) ABSTRACT

Disclosed herein is a method of building a map of a mobile platform moving in a dynamic environment and detecting an object using a 3D camera sensor, e.g., an IR TOF camera sensor, for localization. A localization technology to separate and map a dynamic object and a static object is applied to a mobile platform, such as an unmanned vehicle or a mobile robot. Consequently, the present method is capable of accurately building map information based on the static object in a dynamic environment having a large number of dynamic objects and achieving a dynamic object avoidance or chasing function using position information acquired to build the map.

23 Claims, 7 Drawing Sheets

METHOD OF BUILDING MAP OF MOBILE PLATFORM IN DYNAMIC ENVIRONMENT

CROSS-REFERENCE TO RELATED APPLICATIONS

This application claims the benefit of Korean Patent Application No. 2008-0131035, filed on Dec. 22, 2008 in the Korean Intellectual Property Office, the disclosure of which is incorporated herein by reference.

BACKGROUND

1. Field

The present invention relates to a method of building a map of a mobile platform in a dynamic environment, and, more particularly, to a method of building a map of a mobile platform in a dynamic environment and detecting an object using a three-dimensional (3D) camera sensor, e.g., an infrared time of flight (IR TOF) camera sensor, for localization.

2. Description of the Related Art

With the advancement of an intelligent unmanned technology, much research has been made on self-localization. Localization using inertial navigation is used in limited applications, such as airplanes or missiles. With the commercialization of a global positioning system (GPS) utilizing an artificial satellite, the localization technology is being used in various applications and commercially produces huge added value. Since the localization technology does not still exhibit an excellent performance indoors or in downtown areas, however, much research is in progress to find a solution to exhibit an excellent performance in any place. In recent years, the localization technology is loaded in mobile products usable indoors, from which the implementation of various functions and huge added value produced therefrom are expected.

For example, for a robot (a housework helping robot or a public service robot) utilized in various applications in recent years to move self-controllably, it is required to simultaneously perform a localization process to recognize its position without preliminary information on a peripheral environment and a map building process to build a map from the information on the environment, which is called simultaneous localization and mapping (SLAM).

The SLAM is a technology to build a map in real time and recognize a position using an image and a distance sensor. The SLAM is used as an appropriate substitute for indoor localization. In particular, research is being actively made on SLAM using an evidence grid, which has an advantage in that it is possible to express the peripheral environment through the mapping simultaneously with the localization, thereby achieving the detection of an obstacle. Since the SLAM builds map information in a static environment, however, the result is that the map information is distorted in a dynamic environment having a large number of moving objects (for example, human beings), and the performance of the SLAM is deteriorated.

SUMMARY

Therefore, it is an aspect of the embodiment to provide a method of building accurate map information even in a dynamic environment having a large number of moving objects through the division and mapping of a dynamic object and a static object and detecting the dynamic object using position information acquired to build the map.

Additional aspects and/or advantages will be set forth in part in the description which follows and, in part, will be apparent from the description, or may be learned by practice of the invention.

The foregoing and/or other aspects are achieved by providing a method of building a map of a mobile platform, including acquiring a three-dimensional (3D) image of an environment where the mobile platform moves, extracting feature points from the 3D image to estimate motion states of the respective feature points, clustering the feature points based on the motion states of the respective feature points to divide the feature points into a dynamic map and a static map, and building the mobile platform map based on the static map.

The 3D image may be a disparity map including 3D information of a dynamic object and a static object in a mixed state.

The disparity map may be acquired by a 3D camera sensor.

The extraction of the feature points may be achieved using a volume descriptor of the 3D image.

The estimating the motion states of the feature points may include estimating positions and angular velocities of the feature points using a Joint Probabilistic Data Association Filter (JPDAF).

The clustering the feature points may include determining whether the feature points belong to a dynamic object or a static object using the positions and angular velocities of the feature points and clustering the feature points pre-estimated as the same object into a dynamic cluster or a static cluster.

Only the feature points included in the static cluster may be separated and registered in the static map.

The method may further include calculating a position of the mobile platform using only the feature points registered in the static map and building a map with the dynamic object removed according to the position of the mobile platform.

Only the feature points included in the dynamic cluster may be separated and registered in the dynamic map.

The method may further include creating a dynamic object avoidance path based on the dynamic map.

The creating the dynamic object avoidance path may include extracting an average velocity of the dynamic cluster registered in the dynamic map to pre-estimate a path of the dynamic cluster and creating the dynamic object avoidance path based on the path of the dynamic cluster.

The foregoing and/or other aspects are achieved by providing a method of building a map for a movable unit in a dynamic environment, including acquiring a three-dimensional (3D) image of an environment having a dynamic object, extracting feature points from the 3D image to estimate motion states of the respective feature points, clustering the feature points based on the motion states of the respective feature points to divide the feature points into a dynamic map and a static map, and building the movable unit map based on the static map.

The extraction of the feature points may be achieved using a volume descriptor of the 3D image.

The estimating the motion states of the feature points may include estimating positions and angular velocities of the feature points using a Joint Probabilistic Data Association Filter (JPDAF).

The clustering the feature points may include determining whether the feature points belong to the dynamic object or a static object using the positions and angular velocities of the feature points and clustering the feature points pre-estimated as the same object into a dynamic cluster or a static cluster.

Only the feature points included in the static cluster may be separated and registered in the static map.

The method may further include building the movable unit map with the dynamic object removed using only the feature points registered in the static map.

Only the feature points included in the dynamic cluster may be separated and registered in the dynamic map.

The method may further include creating a dynamic object avoidance path based on the dynamic map.

The creating the dynamic object avoidance path may include extracting an average velocity of the dynamic cluster registered in the dynamic map to pre-estimate a path of the dynamic cluster and creating the dynamic object avoidance path based on the path of the dynamic cluster.

The foregoing and/or other aspects are achieved by providing a method of creating a dynamic object avoidance path of a mobile platform, including: acquiring a three-dimensional (3D) image of an environment in which the mobile platform moves; extracting feature points from the 3D image to estimate motion states of the respective feature points; clustering the feature points based on the motion states of the respective feature points to divide the feature points into a dynamic map and a static map; and creating a dynamic object avoidance path based only on the dynamic map.

The clustering the feature points may include determining whether the feature points belong to a dynamic object or a static object using positions and angular velocities of the feature points and clustering the feature points pre-estimated as the same object into a dynamic cluster or a static cluster.

Only the feature points included in the dynamic cluster may be separated and registered in the dynamic map, and the creating the dynamic object avoidance path may include extracting an average velocity of the dynamic cluster registered in the dynamic map to pre-estimate a path of the dynamic cluster and creating the dynamic object avoidance path based on the path of the dynamic cluster.

BRIEF DESCRIPTION OF THE DRAWINGS

These and/or other aspects and advantages will become apparent and more readily appreciated from the following description of the embodiments, taken in conjunction with the accompanying drawings, of which.

DETAILED DESCRIPTION

Reference will now be made in detail to the embodiment, examples of which are illustrated in the accompanying drawings, wherein like reference numerals refer to like elements throughout. The embodiment is described below to explain the present invention by referring to the figures.

Figure 1:
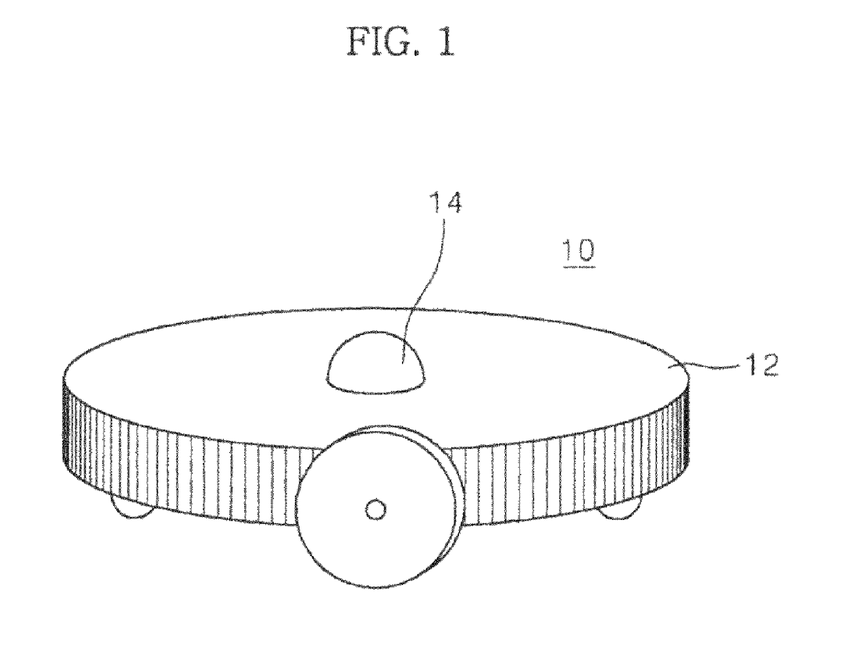
FIG. 1 is a constructional view illustrating an external appearance of a mobile platform according to an embodiment.

FIG. 1 is a constructional view illustrating the external appearance of a mobile platform 10 according to an embodiment. A robot that moves self-controllably in a dynamic environment having a large number of moving objects will be described hereinafter as an example.

In FIG. 1, the mobile platform 10, including a movable robot body 12 and an image acquisition unit 14 mounted to the robot body 12, moves self-controllably in an unknown dynamic environment.

Figure 2:
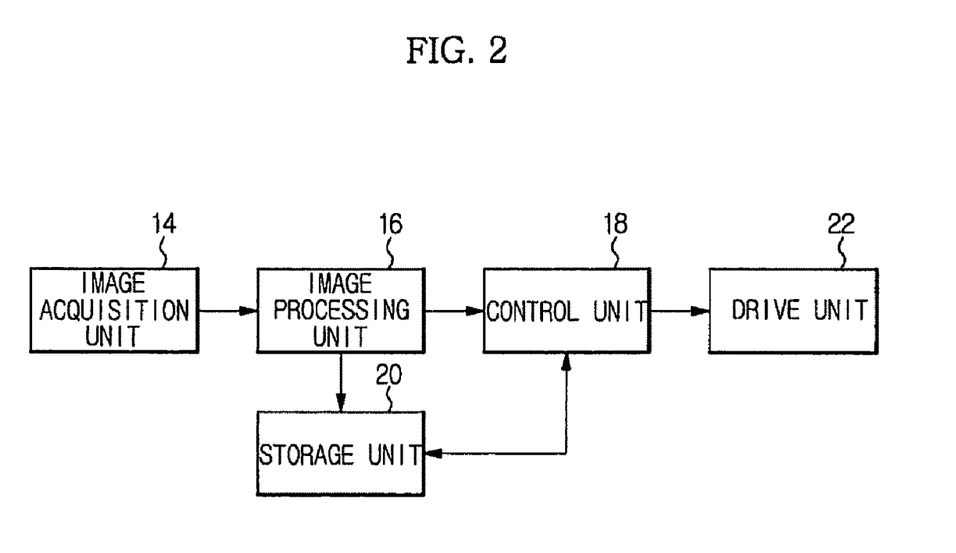
FIG. 2 is a control block diagram of the mobile platform according to the embodiment.

FIG. 2 is a control block diagram of the mobile platform according to the embodiment. The mobile platform includes an image acquisition unit 14, an image processing unit 16, a control unit 18, a storage unit 20, and a drive unit 22.

The image acquisition unit 14 may be implemented by a 3D camera sensor, e.g., an IR TOF sensor, which photographs an image on a movement path of the mobile platform 10 when the mobile platform 10 moves in an unknown environment, in a dynamic environment having a large number of moving objects (hereinafter, referred to as dynamic objects) to acquire a disparity map including 3D information of various objects (for example, static objects or dynamic objects) located on the path in a mixed state. The 3D camera sensor senses distance information of an object detected by the sensor and pixels of a camera as well as image information on each pixel of the camera, which may be utilized as more information in SLAM or an obstacle detection method. One of the most useful information is to utilize curvature information of an object as an additional feature point in addition to a feature point of the image.

When the 3D information (static information and dynamic information) of the disparity map acquired by the image acquisition unit 14 is input, the image processing unit 16 creates a volume descriptor to extract a feature point of the movement path of the mobile platform 10. The feature point is a quantitative point which is not changed depending upon time and a viewing angle when the point is selected in an environment in which the mobile platform 10 moves. In a normal image, a point that is not changed even when viewed at any angle is found using a corner image or an image patch. In this embodiment, x-pixel and y-pixel coordinates on a screen and depth information of the point are utilized using the image acquisition unit 14, e.g. the 3D camera sensor. Consequently, the volume descriptor is used as the feature point.

When feature points extracted by the image processing unit 16 are input, the control unit 18 estimates positions and angular velocities of the respective feature points, clusters the feature points using the estimated positions and the angular velocities of the respective feature points to divide the feature points into a dynamic object map and a static object map, builds map information based on only static objects using the static object map and the dynamic object map which are divided from each other to localize the mobile platform 10, and creates an obstacle avoidance path through the chase of dynamic objects. The control unit may be a central processing unit (CPU).

The storage unit 20 is a memory to store data of the feature points extracted by the image processing unit 16, the map information built by the control unit 18, and the obstacle avoidance path created by the control unit 18. It is required for the storage unit 20 to store the current position and the final target position of the mobile platform 10.

The drive unit 22 drives the mobile platform 10, such that the mobile platform 10 moves self-controllably along the path without the collision of obstacles, based on the map information built by the control unit 18 and the obstacle avoidance path created by the control unit 18.

Figure 3:
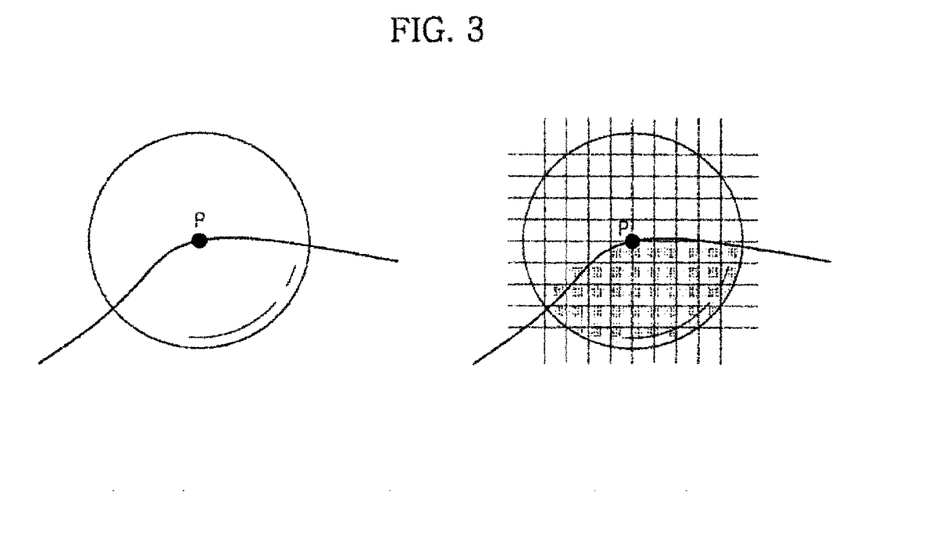
FIG. 3 is a conceptual view illustrating a volume descriptor to extract a feature point according to an embodiment.

FIG. 3 is a conceptual view illustrating a volume descriptor to extract a feature point according to an embodiment.

In FIG. 3, the image processing unit 16 creates a sphere having a predetermined radius about a point P, and defines a common volume between the interior of the sphere and the inner space of an object with the point P being the center thereof as a volume descriptor. The volume descriptor is closely connected with the curvature of the point. The larger the curvature, the smaller the value of the volume descriptor. The smaller the curvature, the larger the value of the volume descriptor. Also, the value of the volume descriptor exhibits an integral property, and therefore, the volume descriptor is more resistant to noise than when the volume descriptor has the curvature itself as a property value. Of course, points corresponding to all image surfaces of the 3D information acquired by the image acquisition unit 14 may be selected as feature points. With the increase in the number of feature points, however, it is required to increase calculation time to find orientation accordingly. Consequently, only several points having volume descriptor values which do not relatively frequently occur are selected as the feature points. To decide such points as the feature points, a method of taking a frequency corresponding to each volume descriptor region using a histogram and selecting points of low-frequency regions is used.

The operation of control unit 18 shown in FIG. 2 will be described in detail with reference to FIGS. 4 to 6.

Figure 4:
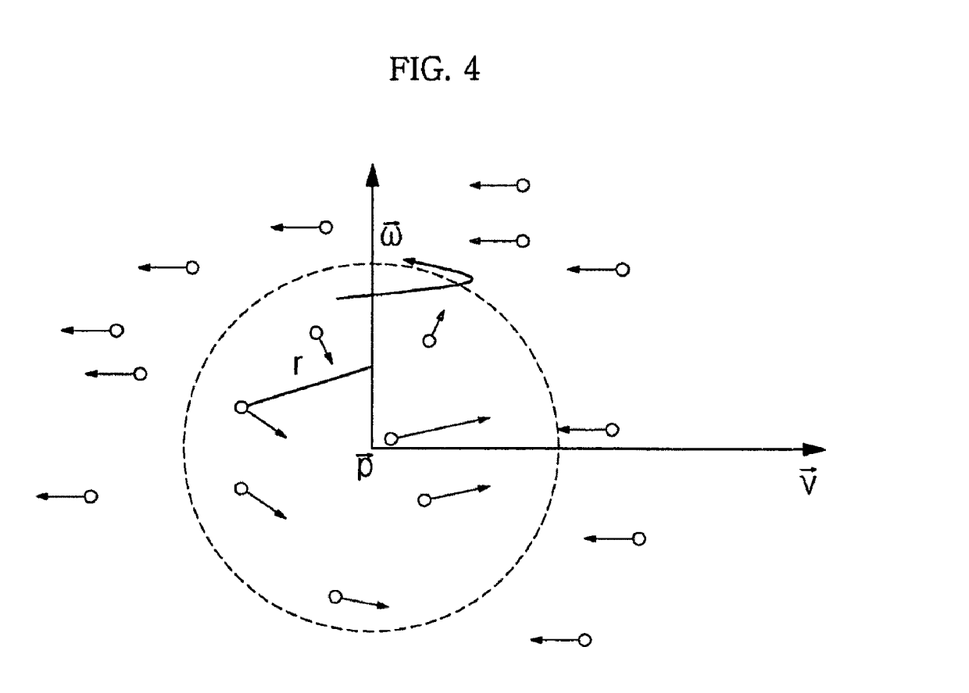
FIG. 4 is a view illustrating the motion state of a feature point according to an embodiment.
Figure 5:
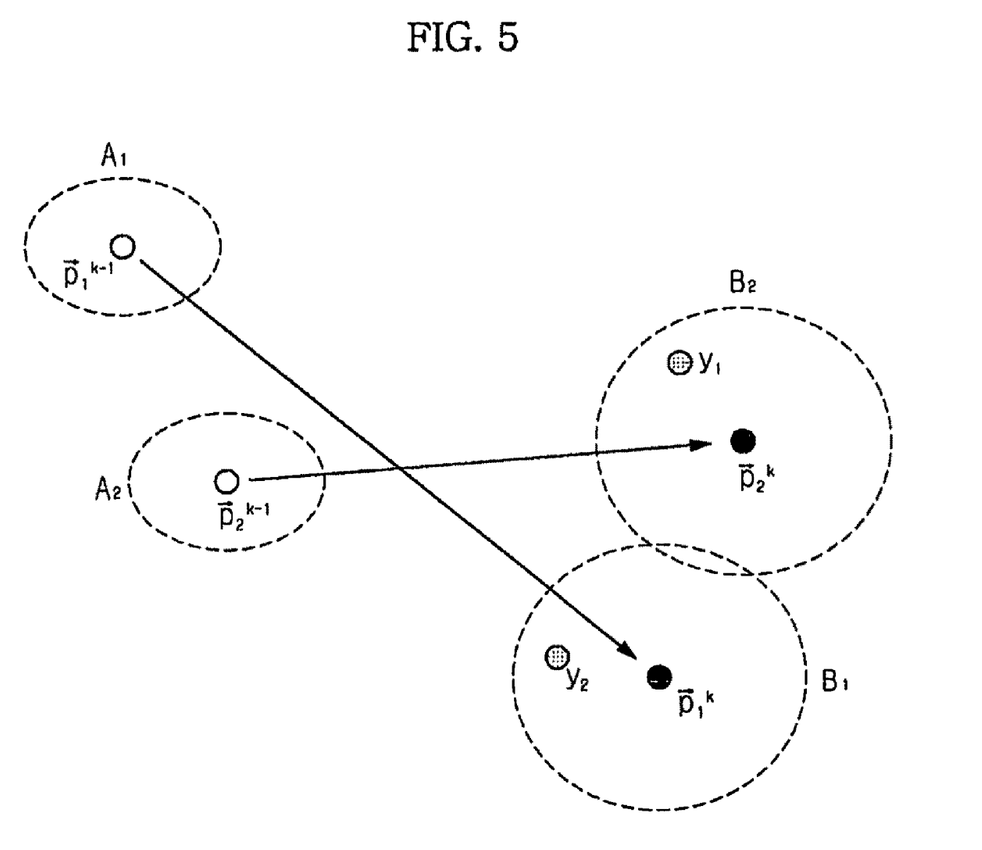
FIG. 5 is a view illustrating a correspondence method of a JPDAF to estimate the motion state of a feature point according to an embodiment.
Figure 6:
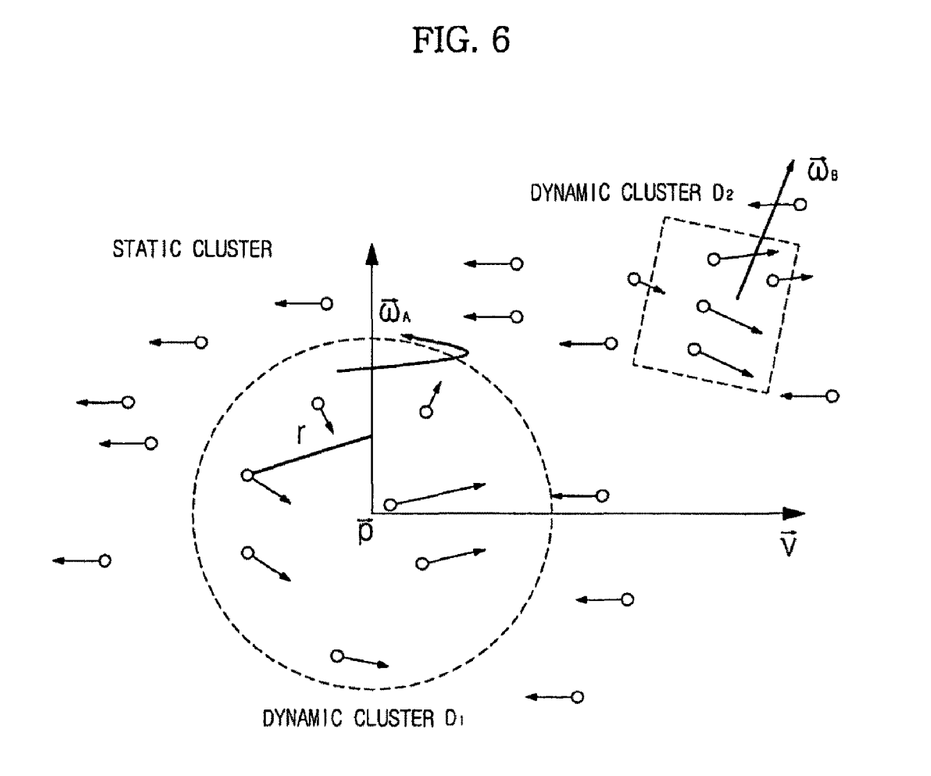
FIG. 6 is a view illustrating clustering of the feature point according to the embodiment.

FIG. 4 is a view illustrating the motion state of a feature point according to an embodiment, FIG. 5 is a view illustrating a correspondence method of a Joint Probabilistic Data Association Filter (JPDAF) to estimate the motion state of a feature point according to an embodiment, and FIG. 6 is a view illustrating clustering of the feature point according to the embodiment.

The control unit 18 uses a JPDAF to estimate the motion state of feature points extracted by the image processing unit 16.

The JPDAF is the most typical method of tracking several dynamic objects. Basically, the JPDAF is one of the data association methods to determine several estimate values estimating the state of an object to be tracked and several sensor values becoming estimate grounds corresponding to each other such that the estimate values and the sensor values have the highest probability. An advantage of the JPDAF is that, when using an approximate mathematical model, it is possible to calculate an accurate estimate value of an accelerated object as well as a constant velocity object, and the JPDAF is resistant to a cluster environment. Consequently, it is possible to track the dynamic object even in an environment in which the performance of the 3D camera sensor is poor, and therefore, a disparity map having a somewhat large amount of noise is acquired.

The JPDAF basically performs a Kalman filter algorithm. In a pre-estimate process, the integral update is performed on each point having a mathematical model to pre-estimate the position at which the point will be located at the next time. In this process, an error covariance to the position pre-estimate value is calculated together depending upon the accuracy of the model. That is, for an accurate model, the pre-estimate error covariance decreases. For an inaccurate model, the pre-estimate error covariance increases. In this embodiment, state variables on the respective feature points are set as follows, and a model used in the pre-estimate process of the Kalman filter is represented by [Equation 1].

$$x = (\vec{p}\ \vec{v}\ \vec{\omega}\ r)$$ [Equation 1]

Where, $\vec{p}$ indicates a spatial position, $\vec{v}$ indicates a spatial velocity at the center of rotation, $\vec{\omega}$ indicates an angular velocity, and r indicates the distance (rotational radius) from the feature point to the rotational axis (see FIG. 4).

[Equation 1] is expressed as a numerical expression of an error covariance matrix as represented by [Equation 2].

$$f(x) = \begin{bmatrix} \vec{v} + r \times \vec{\omega} \\ v_v \\ v_\omega \\ v_r \end{bmatrix}$$ [Equation 2]

Where, $v_v$, $v_\omega$, $v_r$ indicate covariance values.

Generally, when it is assumed that there are a set A consisting of n points at time t and a set B consisting of n points at time t+dt in a space, one of the methods of making the set A and the set B correspond to each other one to one is to make pairs having the nearest distance correspond to each other. However, when the points are moving, a more accurate method is to estimate at which positions the set A will be located after time dt and make pairs having a near distance correspond to each other, and not to make pairs having the nearest distance correspond to each other (see FIG. 5).

In the Kalman filter, it is required to update sensor measurement values corresponding to the respective estimate values to reduce the estimate error of the filter. In this situation, it cannot be known which measurement values and which estimate values correspond to each other. However, in the update process, the most probably approximate points are made to correspond to each other using the JPDAF to find the correspondence from which the smallest covariance, i.e., the most accurate estimate value, can be acquired, and to update the measurement value therethrough. In FIG. 5, $\vec{p}_1^{k-1}$, $\vec{p}_2^{k-1}$ are position estimate values when t is k−1, $\vec{p}^2$, $\vec{p}^2$ are position estimate values when t is k, and y1, y2 are position measurement values when t is k. When making the measurement values and the estimate values correspond to each other simply based on the nearest positions, $\vec{p}_1^{k-1}$ and y1 must be made to correspond to each other, and $\vec{p}_2^{k-1}$ and y2 must be made to correspond to each other. However, the JPDAF can make $\vec{p}_1^{k-1}$ and y2 correspond to each other and make $\vec{p}_2^{k-1}$ and y1 correspond to each other using the previously defined dynamic model. The latter may be a more probably accurate correspondence method. Through such a filtering process, it is possible to acquire the estimate values of the positions of the feature points, the angular velocities, and the rotational radii while chasing the respective feature points previously selected based on the volume descriptor.

Also, the control unit 18 clusters the feature points that can be pre-estimated as the same object using the motion state of the feature points estimated using the JPDAF, i.e., the positions of the respective feature points and the angular velocities, to divide the feature points into a map of static objects (hereinafter, referred to as a static object map) and a map of dynamic objects (hereinafter, referred to as a dynamic object map). It is possible to obtain the estimate values of the spatial positions, the spatial velocities at the center of rotation, and the spatial angular velocities of the feature points, and the distances (rotational radii) from the feature points to the rotational axis, using the JPDAF. Consequently, it is possible to calculate which feature points belong to which objects by extracting such estimate values from the respective feature points. It can be easily understood that rigid objects have the same angular velocity and the same objects have a near distance. Therefore, a distance concept may be newly defined as represented by [Equation 3].

$$d^2 = W_1(\vec{p}_1 - \vec{p}_2)^2 + W_2(\vec{\omega}_1 - \vec{\omega}_2)^2 \qquad \text{[Equation 3]}$$

That is, a single object may be assumed when the distances between the feature points are small and the feature points have similar angular velocities. W1 and W2 are weighted values to decide whether more weight is placed on the angular velocity or the position. In this embodiment, the feature points are hierarchically clustered with the distance definition of d. Different rigid objects may be assumed when the distance d exceeds a reference value λ. In this case, when the distance between the feature points is d or more, the feature points may be divided into n clusters (see FIG. 6).

Also, the control unit 18 removes a dynamic part from a static part, using the divided static map and dynamic map, to perform the SLAM process, and acquires a function to avoid or track dynamic objects using a tracking technology to be essentially embodied to perform the process.

It is not easy to divide the acquired 3D information into static feature points and dynamic feature points. Particularly for the image acquisition unit 14 mounted to the moving mobile platform 10, the entire image moves, and therefore, it is difficult to determine which must be selected as a localization index. The disparity map acquired by the image acquisition unit 14 includes static information and dynamic information in a mixed state, with the result that the calculation of the position information is distorted due to the feature points recorded by the dynamic objects unless additionally considering the dynamic information. In this embodiment, therefore, the dynamic part is removed from the static part, using a method of performing the division between a dynamic environment and a static environment, to perform the SLAM process.

First, the initial map registers and tracks only the static feature points to perform the SLAM. When the initialization is ended, on the assumption that no dynamic objects enter the environment in this state, the clustering is performed. When newly created feature points after the clustering are included in the cluster corresponding to the static map, a predetermined time is registered as a candidate group of the static map. When the time registered as the candidate group exceeds a determination time td, it is formally registered as a feature point of the static map. Trigonometry is carried out, using points registered as the feature points of the static map, to perform localization. Since the feature points of the static map may be hidden by the intervention of the dynamic object or due to the viewing angle of the sensor, the registration is not canceled to the instantaneously disappearing static map. However, the static map under the tracking enters a different dynamic cluster through the clustering, and it is registered as a registration cancellation candidate group in the same manner. After the lapse of time td, it is canceled from the static map and enters the dynamic map. Through this process, it is possible to perform the SLAM without being affected by the objects exhibiting dynamic properties.

In the same manner, the dynamic map includes a point corresponding to the dynamic cluster in a candidate group. After the lapse of time td, it is registered as the dynamic map. Since the feature point of the dynamic map is continuously tracked, it is also possible to acquire the estimate value of the velocity at the center of the object by using the central value of the cluster. Also, it is possible to calculate the approximate size of the cluster by estimating the maximum and minimum of the position value of the cluster. The estimation of the velocity of the cluster creates an avoidance path or a tracking path relative to the advancing direction of the mobile platform 10, thereby actively dealing with the dynamic object.

Hereinafter, a method of building a map of the mobile platform in the dynamic environment constructed as described above will be described.

Figure 7:
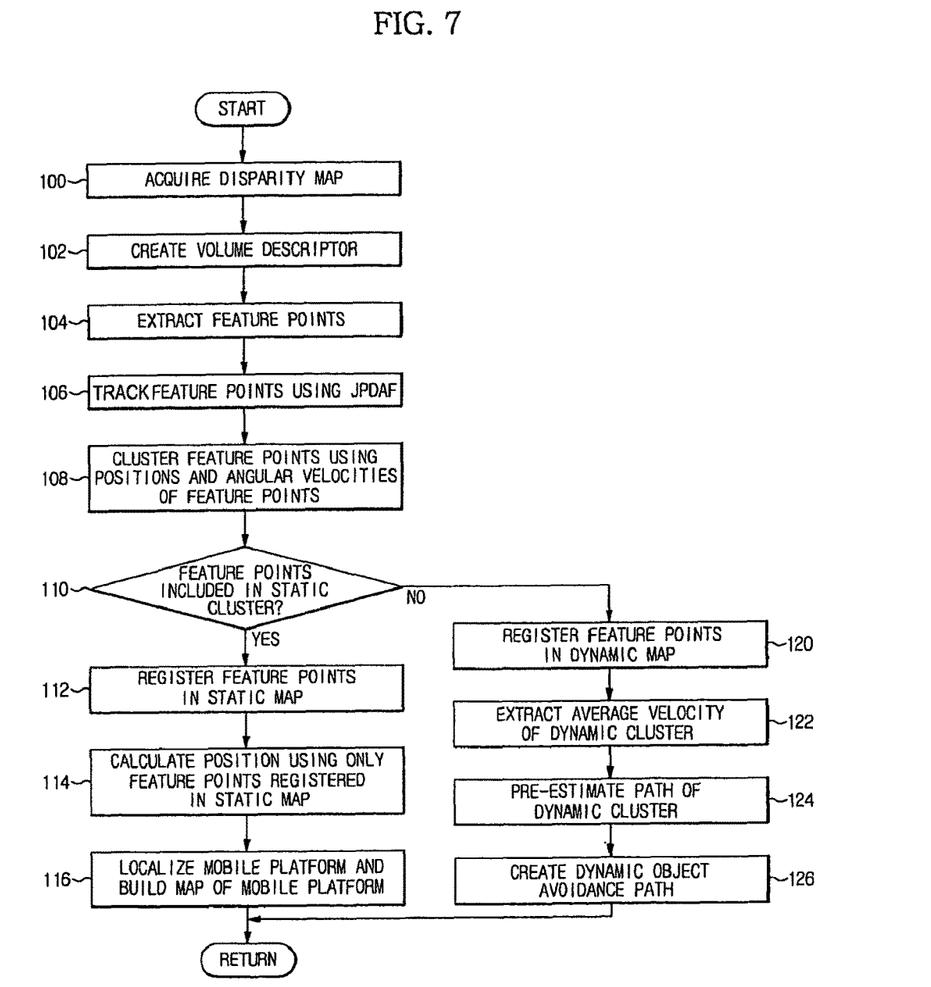
FIG. 7 is a flow chart illustrating a method of localizing a mobile platform and building a map of the mobile platform in a dynamic environment and a method of detecting an object according to an embodiment.

FIG. 7 is a flow chart illustrating a method of localizing a mobile platform and building a map of the mobile platform in a dynamic environment and a method of detecting an object according to an embodiment.

In FIG. 7, when the mobile platform 10 starts to move in an environment having a large number of dynamic objects (a dynamic environment), an image on a movement path of the mobile platform 10 is photographed by the image acquisition unit 14 to acquire a disparity map including 3D information of various objects (for example, static objects or dynamic objects) located on the path in a mixed state (100).

Subsequently, the image processing unit 16 receives the 3D information of the disparity map acquired by the image acquisition unit 14 and creates a volume descriptor, as shown in FIG. 3, to extract feature points of the movement path of the mobile platform 10 (102). It is required for each feature point to exhibit a quantitative property in which the feature point is not changed depending upon time and a viewing angle when the point is selected in an environment in which the mobile platform 10 moves. In a normal image, a point which is not changed even when viewed at any angle is found using a corner image or an image patch. In this embodiment, x-pixel and y-pixel coordinates on a screen and depth information of the point are utilized using the image acquisition unit 14, e.g., the 3D camera sensor. Consequently, the volume descriptor is used as the feature point (104).

Subsequently, the control unit 18 tracks the feature points extracted by the image processing unit 16 using the JPDAF (106). The JPDAF is the most typical method of tracking several dynamic objects. As shown in FIGS. 4 and 5, it is possible to the estimate values of the spatial positions, the spatial velocities at the center of rotation, and the spatial angular velocities of the feature points, and the distances (rotational radii) from the feature points to the rotational axis, using the JPDAF.

Subsequently, as shown in FIG. 6, the control unit 18 clusters the feature points into a static cluster or dynamic clusters D1, D2 . . . using the positions and the angular velocities of the estimated feature points (108), and determines whether the feature points clustered in the static cluster or dynamic clusters D1, D2 . . . are included in the static cluster (110).

When it is determined at operation 110 that the feature points are included in the static cluster, the control unit 18 registers the feature points in a static map (112), and calculates the position of the mobile platform 10 under the movement using only the feature points registered in the static map (114).

Subsequently, the control unit 18 builds map information only based on the static objects through the compensation for the dynamic environment to remove the dynamic part from the static part and localizes the mobile platform 10 with the improved SLAM (116).

On the other hand, when it is determined at operation 110 that the feature points are not included in the static cluster, the control unit 18 registers the feature points in a dynamic map (120), and extracts the average velocity of the dynamic clusters registered in the dynamic map (122) to pre-estimate a path of the dynamic clusters (124). Subsequently, the control unit 18 pre-estimates a path along which the dynamic objects will move to create a dynamic object avoidance path (126).

In this embodiment, the dynamic map and the static map are divided from each other to solve the problem in that the performance of the SLAM, which is considered as an appropriate substitute for indoor localization, is deteriorated in an environment having a large number of dynamic objects, and the performance of the SLAM is improved using the divided static map. Therefore, this embodiment contributes to the presentation of the direction to perform a navigation function in a general environment (unknown environment) and the improvement of the robustness of the SLAM.

In this embodiment, meanwhile, a mobile robot that moves self-controllably, such as a mobile service robot or an intelligent humanoid robot, was described as an example of the mobile platform 10, to which, however, the present embodiment is not limited. The present embodiment is applicable to various applications. For example, the mobile platform may be loaded in a mobile phone or in a wearable form to recognize the current position and inform of an advancing direction. Alternatively, the mobile platform may be loaded in a vehicle to guide the vehicle to reach the destination in an unmanned fashion or automatically park the vehicle.

As apparent from the above description, a localization technology to separate and map a moving object and a stationary object is applied to a mobile platform, such as an unmanned vehicle or a mobile robot. Consequently, the present embodiment is capable of accurately building map information based on the stationary object (the static object) in a dynamic environment having a large number of dynamic objects and achieving a dynamic object avoidance or chasing function using position information acquired to build the map.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A method of building a map of a mobile platform, comprising:
   acquiring, by a processor, a three-dimensional (3D) image of an environment in which the mobile platform moves;
   extracting feature points from the 3D image to estimate motion states of the respective feature points;
   clustering the feature points based on the motion states of the respective feature points to divide the feature points into a dynamic map and a static map; and
   building the mobile platform map based on the static map.

2. The method according to claim 1, wherein the 3D image is a disparity map including 3D information of a dynamic object and a static object in a mixed state.

3. The method according to claim 2, wherein the disparity map is acquired by a 3D camera sensor.

4. The method according to claim 1, wherein the extraction of the feature points is achieved using a volume descriptor of the 3D image.

5. The method according to claim 1, wherein the estimating the motion states of the feature points comprises estimating positions and angular velocities of the feature points using a Joint Probabilistic Data Association Filter (JPDAF).

6. The method according to claim 5, wherein the clustering the feature points comprises determining whether the feature points belong to a dynamic object or a static object using the positions and angular velocities of the feature points and clustering the feature points pre-estimated as the same object into a dynamic cluster or a static cluster.

7. The method according to claim 6, wherein only the feature points included in the static cluster are separated and registered in the static map.

8. The method according to claim 7, further comprising calculating a position of the mobile platform using only the feature points registered in the static map and building the map of the mobile platform with the dynamic object removed according to the position of the mobile platform.

9. The method according to claim 6, wherein only the feature points included in the dynamic cluster are separated and registered in the dynamic map.

10. The method according to claim 9, further comprising creating a dynamic object avoidance path based on the dynamic map.

11. The method according to claim 10, wherein the creating the dynamic object avoidance path comprises extracting an average velocity of the dynamic cluster registered in the dynamic map to pre-estimate a path of the dynamic cluster and creating the dynamic object avoidance path based on the path of the dynamic cluster.

12. A method of building a map for a movable unit in a dynamic environment, comprising:
   acquiring, by a processor, a three-dimensional (3D) image of an environment having a dynamic object;
   extracting feature points from the 3D image to estimate motion states of the respective feature points;
   clustering the feature points based on the motion states of the respective feature points to divide the feature points into a dynamic map and a static map; and
   building the movable unit map based on the static map.

13. The method according to claim 12, wherein the extraction of the feature points is achieved using a volume descriptor of the 3D image.

14. The method according to claim 12, wherein the estimating the motion states of the feature points comprises estimating positions and angular velocities of the feature points using a Joint Probabilistic Data Association Filter (JPDAF).

15. The method according to claim 14, wherein the clustering the feature points comprises determining whether the feature points belong to the dynamic object or a static object using the positions and angular velocities of the feature points and clustering the feature points pre-estimated as the same object into a dynamic cluster or a static cluster.

16. The method according to claim 15, wherein only the feature points included in the static cluster are separated and registered in the static map.

17. The method according to claim 16, further comprising building the movable unit map with the dynamic object removed using only the feature points registered in the static map.

18. The method according to claim 15, wherein only the feature points included in the dynamic cluster are separated and registered in the dynamic map.

19. The method according to claim 18, further comprising creating a dynamic object avoidance path based on the dynamic map.

20. The method according to claim 19, wherein the creating the dynamic object avoidance path comprises extracting an average velocity of the dynamic cluster registered in the dynamic map to pre-estimate a path of the dynamic cluster and creating the dynamic object avoidance path based on the path of the dynamic cluster.

21. A method of creating a dynamic object avoidance path of a mobile platform, comprising:
   acquiring, by a processor, a three-dimensional (3D) image of an environment in which the mobile platform moves;

extracting feature points from the 3D image to estimate motion states of the respective feature points;

clustering the feature points based on the motion states of the respective feature points to divide the feature points into a dynamic map and a static map; and creating the dynamic object avoidance path based only on the dynamic map.

22. The method according to claim 21, wherein the clustering the feature points comprises determining whether the feature points belong to a dynamic object or a static object using positions and angular velocities of the feature points and clustering the feature points pre-estimated as the same object into a dynamic cluster or a static cluster.

23. The method according to claim 22, wherein only the feature points included in the dynamic cluster are separated and registered in the dynamic map, and wherein the creating the dynamic object avoidance path comprises extracting an average velocity of the dynamic cluster registered in the dynamic map to pre-estimate a path of the dynamic cluster and creating the dynamic object avoidance path based on the path of the dynamic cluster.

* * * * *